May 2, 1933.  H. R. GIBBONS  1,906,259

ANTIFRICTION BEARING

Original Filed April 3, 1928

INVENTOR:
HAROLD R. GIBBONS,
BY
HIS ATTORNEY.

Patented May 2, 1933

1,906,259

UNITED STATES PATENT OFFICE

HAROLD R. GIBBONS, OF CHATHAM, NEW JERSEY, ASSIGNOR TO GENERAL MOTORS CORPORATION, OF DETROIT, MICHIGAN, A CORPORATION OF DELAWARE

ANTIFRICTION BEARING

Original application filed April 3, 1928, Serial No. 266,928. Divided and this application filed April 22, 1932. Serial No. 607,144.

This invention relates to antifriction bearings and comprises all of the features and aspects of novelty herein disclosed. An object of the invention is to provide an improved method of assembling antifriction bearings, especially of the self-aligning, elongated-roller type having roller separators. Another object is to provide an improved method of assembling antifriction bearings and holding the assembled parts from accidental separation during handling or mounting. To these ends and also to improve generally upon methods of this character, the invention consists in the various matters hereinafter described and claimed.

This application is a division of application No. 266,928, filed April 3, 1928.

In its broader aspects, the invention is not necessarily limited to the specific steps disclosed for illustrative purposes in the accompanying drawing in which Fig. 1 is a transverse central section of the bearing.

Figure 1:
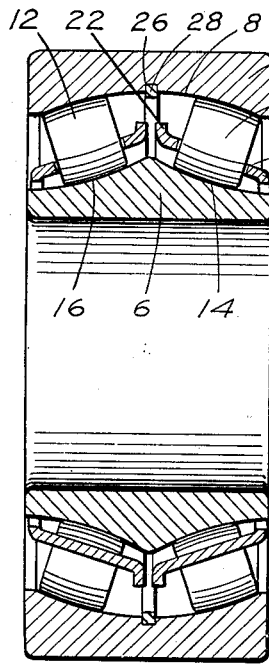
Figure 2:
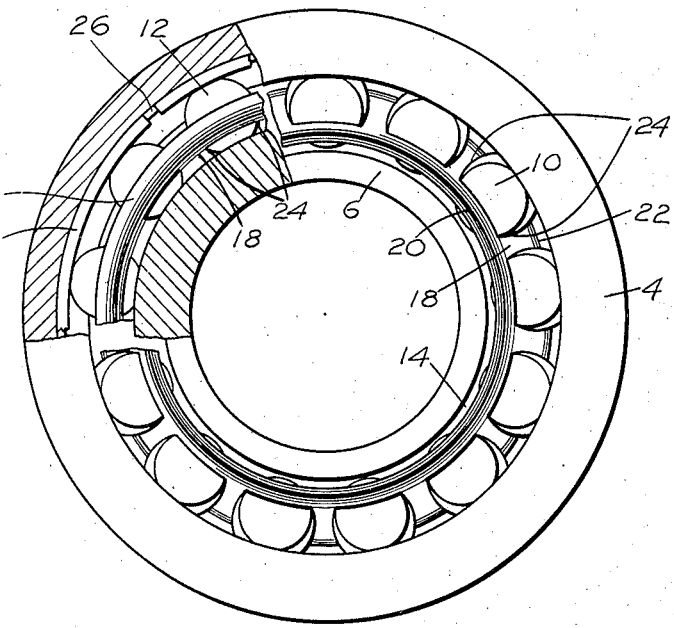
Fig. 2 is a side elevation partly broken away and in section.

The numeral 4 indicates an outer race ring and numeral 6 an inner race ring. One of the rings, preferably the outer, has a raceway surface 8 formed as the equatorial zone of a sphere, the center of curvature preferably being at the geometric center of the race ring. Two rows of rolling elements, 10 and 12, run on separated portions of the spherical raceway. These rolling elements are here shown as of what may be termed the elongated genus (that is, they are not mere balls), and they preferably have a transverse curvature which makes them conform with substantially line contact to the spherical raceway. The inner race ring has oppositely inclined raceways 14 and 16 which have a transverse curvature conforming to the rollers with substantially line contact. The rollers are preferably symmetrical, having a length about equal to the diameter and with rounded corners, and in the illustrated form are barrel-shaped.

A separator is provided for each row of rollers, and comprises a generally frustoconical body portion or band 18, an inwardly extending rounded stiffening flange 20 and an outwardly extending rounded stiffening flange 22. The body portion has pockets or openings with the rims conforming to the rollers and is of such diameter that the front and rear edges 24 of the openings engage the rollers on the opposite side of the circle through the roller axes, from the spherically surfaced race ring. In other words the openings are narrower than the maximum diameter of the rollers so that, with the spherically surfaced race ring displaced, the rollers can be inserted in the openings from the same side of the separator as the spherically surfaced race ring. The spherical surface has a central annular groove 26 for a split spring ring 28 which makes an arcuate projection between the rows of rollers to limit the cocking or tilting of the parts when the bearing is being mounted. This makes for easier handling of the bearing when being mounted and avoids any cocking or tilting sufficient to let the rollers escape from their pockets.

Figure 3:
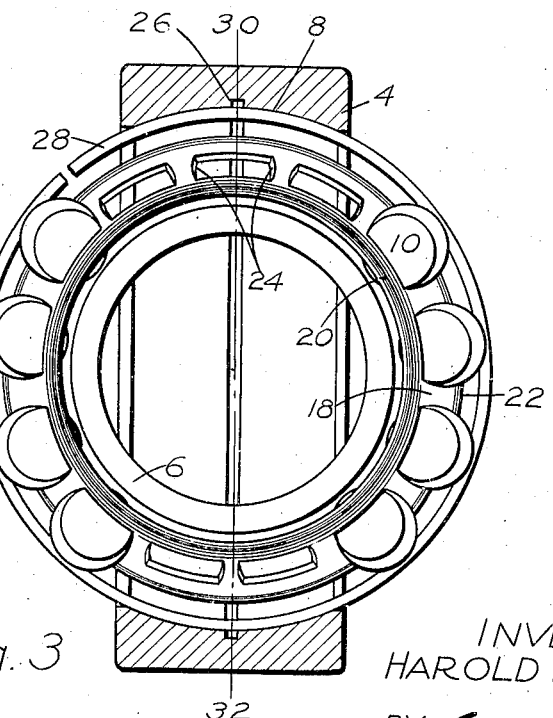
Fig. 3 is a view indicating the method of assembly, some of the bearing parts being in side elevation and one part being in section.

In assembling the parts of the illustrated bearing, the inner race ring, both separators and the split ring are arranged at right angles to the outer race ring as indicated in Fig. 3, the split ring being sprung to make it engage the spherical raceway. The rollers are then inserted in the exposed pockets of the separators and the separators can be given a partial rotation on their axes to expose the remaining pockets. Then the inner race ring, separators, rollers and split ring are all turned a quarter turn around an axis 30, 32 to bring them into parallelism with the outer race ring. The split ring then snaps into its groove and thereafter holds the parts from cocking back to a position which will release the rollers. It will be understood that either the inner race ring, the outer race ring or both may be given the described relative swinging movement to effect assembly.

I claim:

1. The method of assembling antifriction bearings which consists in placing a group of parts cross-wise of a race-member whose race-surface defines a zone of a sphere and has a medial groove opening upon the same, said group comprising a second race-member, two rows of co-operating rolling-elements, and a resilient stop-ring between said rows, and then swinging one of said race-members relatively to the other in the direction to bring said ring into coincidence with said groove, whereby the bearing parts are brought into operative position and said ring snaps into said groove; substantially as described.

2. The method of assembling antifriction bearings which consists in placing a group of parts cross-wise in an outer race-member whose inner race-surface defines a zone of a sphere and has a medial groove opening upon the same, said group comprising an inner race-member, two rows of co-operating rolling-elements, and a resilient stop-ring between said rows, said stop-ring tensionally engaging said race-surface of said outer race-member, and then swinging one of said race-members relatively to the other in the direction to bring said ring into coincidence with said groove, whereby the bearing parts are brought into operative position and said ring snaps into said groove; substantially as described.

3. The method of assembling antifriction bearings which consists in placing about an inner race-member a central, resilient stop-ring and a separator which has openings for rolling-elements, placing said group of parts cross-wise in an outer race-member whose inner race-surface defines the zone of a sphere and has a groove about it opening upon said surface, placing two rows of rolling-elements upon said inner race-member, and then swinging one of said race-members relatively to the other in the direction to bring said ring into coincidence with said groove, whereby the bearing parts are brought into operative position and said ring snaps into said groove; substantially as described.

4. The method of assembling antifriction bearings which consists in placing about an inner race-member a central, resilient stop-ring and two laterally-related separators whose bodies have openings for rolling-elements and lie between said race-member and the axes of rotation of said rolling elements, placing said group of parts cross-wise in an outer race-member whose inner, race-surface defines the zone of a sphere and has a medial groove opening upon said surface, placing two rows of rolling-elements upon said inner race-member through said openings of said separators, and then swinging one of said race-members relatively to the other in the direction to bring said ring into coincidence with said groove, whereby the bearing parts are brought into operative position and said ring snaps into said groove; substantially as described.

5. The method of assembling the parts of a bearing having inner and outer race rings, a resilient ring, two rows of rolling elements, and one race ring having a spherical surface with a medial groove therein, which consists in placing the grooved race ring crosswise of the remaining parts with the resilient ring yieldingly engaging the spherical surface, and causing a relative swinging movement between the grooved race ring and the remaining parts to bring the rolling elements into operative position and to snap the resilient ring into the groove; substantially as described.

6. The method of assembling the parts of a bearing having inner and outer race rings, a resilient ring, two rows of rolling elements, a pocketed separator for each row of rolling elements, and one race ring having a spherical surface with a medial groove therein, which consists in placing the grooved race ring crosswise with respect to the other race ring, resilient ring and separators, inserting some of the rolling elements into the exposed separator pockets, causing a relative rotation between the separators and the grooved race ring, inserting other rolling elements into the newly exposed pockets, and then causing a relative swinging movement between the grooved race ring and the remaining parts to bring the rolling elements into running position and to snap the resilient ring into the groove; substantially as described.

7. The method of assembling the parts of a bearing having inner and outer race rings, two rows of rolling elements, a pocketed separator for each row of rolling elements, and one race ring having a spherical surface, which consists in placing one race ring crosswise with respect to the other race ring and separators, inserting some of the rolling elements into the exposed separator pockets, causing a relative rotation between the separators and the spherically surfaced race ring, inserting other rolling elements into the newly exposed pockets, and then causing a relative swinging movement between the spherically surfaced race ring and the remaining parts to bring the rolling elements into running position between the race rings; substantially as described.

8. The method of assembling the parts of a bearing having inner and outer race rings, rolling elements, a separator ring having openings with the rims conforming to the rolling elements, and one race ring having a spherical surface, which consists in placing one race ring crosswise with respect to the remaining rings, inserting some of the rolling elements through the exposed separator openings into contact with the adjacent race ring, causing a relative rotation between the separator and the spherically surfaced race ring, inserting other rolling elements through the newly exposed separator openings, and then causing a relative swinging movement between the spherically surfaced race ring and the remaining parts to bring the rolling elements into running position between the race rings; substantially as described.

9. The method of assembling the parts of a bearing having inner and outer race rings, a resilient ring, rolling elements, a separator ring having openings for the rolling elements, and one race ring having a spherical surface with a medial groove therein, which consists in placing the grooved race ring crosswise of the remaining rings with the resilient ring yieldingly engaging the spherical surface, inserting rolling elements through the openings of the separator ring into contact with the adjacent race ring, and causing a relative swinging movement between the grooved race ring and the remaining parts to bring the rolling elements into operative position and to snap the resilient ring into the groove; substantially as described.

10. The method of assembling the parts of a bearing having inner end outer race rings, a resilient ring, rolling elements, and one race ring having a spherical surface with a medial groove therein, which consists in placing the grooved race ring crosswise of the remaining parts with the resilient ring yieldingly engaging the spherical surface, and causing a relative swinging movement between the grooved race ring and the remaining parts to bring the rolling elements into operative position and to snap the resilient ring into the groove; substantially as described.

In testimony whereof I hereunto affix my signature.

HAROLD R. GIBBONS.